(12) United States Patent
Paolini, Jr. et al.

(10) Patent No.: US 7,679,814 B2
(45) Date of Patent: Mar. 16, 2010

(54) MATERIALS FOR USE IN ELECTROPHORETIC DISPLAYS

(75) Inventors: Richard J. Paolini, Jr., Framingham, MA (US); George G. Harris, Woburn, MA (US); Charles Howie Honeyman, Roslindale, MA (US); Craig A. Herb, Medford, MA (US); Richard M. Webber, Brookline, MA (US); Thomas H. Whitesides, Somerville, MA (US)

(73) Assignee: E Ink Corporation, Cambridge, MA (US)

( * ) Notice: Subject to any disclaimer, the term of this patent is extended or adjusted under 35 U.S.C. 154(b) by 447 days.

(21) Appl. No.: 11/625,907

(22) Filed: Jan. 23, 2007

(65) Prior Publication Data

US 2007/0146310 A1    Jun. 28, 2007

Related U.S. Application Data

(63) Continuation-in-part of application No. 10/063,236, filed on Apr. 2, 2002, now Pat. No. 7,170,670, and a continuation-in-part of application No. 10/711,829, filed on Oct. 7, 2004, now Pat. No. 7,230,750, which is a continuation-in-part of application No. 10/708,130, filed on Feb. 9, 2004, now Pat. No. 7,002,728, which is a continuation-in-part of application No. 10/063,803, filed on May 15, 2002, now Pat. No. 6,822,782, application No. 11/625,907, and a continuation-in-part of application No. 10/907,140, filed on Mar. 22, 2005, now Pat. No. 7,327,511, which is a continuation-in-part of application No. 10/905,746, filed on Jan. 19, 2005.

(60) Provisional application No. 60/280,951, filed on Apr. 2, 2001, provisional application No. 60/481,486, filed on Oct. 8, 2003, provisional application No. 60/481,572, filed on Oct. 28, 2003, provisional application No. 60/481,574, filed on Oct. 29, 2003, provisional application No. 60/291,081, filed on May 15, 2001, provisional application No. 60/481,920, filed on Jan. 20, 2004, provisional application No. 60/521,010, filed on Feb. 5, 2004, provisional application No. 60/555,529, filed on Mar. 23, 2004, provisional application No. 60/585,879, filed on Jul. 7, 2004.

(51) Int. Cl.
*G02B 26/00* (2006.01)
*G09G 3/34* (2006.01)

(52) U.S. Cl. ........................ 359/296; 345/107
(58) Field of Classification Search ............... 359/296; 345/84, 85, 87, 95, 97, 107, 108; 264/4.1, 264/4.3, 4.33; 428/402.2, 402.21; 204/664, 204/665

See application file for complete search history.

(56) References Cited

U.S. PATENT DOCUMENTS 3,668,106 A    6/1972    Ota (Continued)

FOREIGN PATENT DOCUMENTS

EP        1 099 207 B1        3/2002

(Continued)

OTHER PUBLICATIONS

Tuinier et al., "Depletion-induced phase separation in colloid-polymer mixtures", Advances in Colloid and Interface Science, 103, (2003) 1-31. LISTCONT

*Primary Examiner*—Loha Ben
(74) *Attorney, Agent, or Firm*—David J. Cole (57) ABSTRACT

The image stability of electrophoretic media, comprising a plurality of particles disposed in a fluid and capable of moving through the fluid upon application of an electric field to the medium, can be improved by including in the fluid either a polystyrene or an aggregating diblock copolymer which forms micelle-like structures in the fluid, the diblock copolymer having a first block soluble in the fluid and a second block not swellable by the fluid. In variable transmission electrophoretic media, haze can be reduced by using as the fluid a mixture of a partially hydrogenated aromatic hydrocarbon and a terpene.

32 Claims, 5 Drawing Sheets

U.S. PATENT DOCUMENTS

| | | | |
|---|---|---|---|
| 3,756,693 A | 9/1973 | Ota | |
| 3,767,392 A | 10/1973 | Ota | |
| 3,792,308 A | 2/1974 | Ota | |
| 3,870,517 A | 3/1975 | Ota et al. | |
| 3,892,568 A | 7/1975 | Ota | |
| 4,418,346 A | 11/1983 | Batchelder | |
| 5,411,656 A * | 5/1995 | Schubert | 345/107 |
| 5,745,094 A | 4/1998 | Gordon, II et al. | |
| 5,760,761 A | 6/1998 | Sheridon | |
| 5,777,782 A | 7/1998 | Sheridon | |
| 5,808,783 A | 9/1998 | Crowley | |
| 5,872,552 A | 2/1999 | Gordon, II et al. | |
| 5,930,026 A | 7/1999 | Jacobson et al. | |
| 5,961,804 A | 10/1999 | Jacobson et al. | |
| 6,017,584 A | 1/2000 | Albert et al. | |
| 6,054,071 A | 4/2000 | Mikkelsen, Jr. | |
| 6,055,091 A | 4/2000 | Sheridon et al. | |
| 6,067,185 A | 5/2000 | Albert et al. | |
| 6,097,531 A | 8/2000 | Sheridon | |
| 6,118,426 A | 9/2000 | Albert et al. | |
| 6,120,588 A | 9/2000 | Jacobson | |
| 6,120,839 A | 9/2000 | Comiskey et al. | |
| 6,124,851 A | 9/2000 | Jacobson | |
| 6,128,124 A | 10/2000 | Silverman | |
| 6,130,773 A | 10/2000 | Jacobson et al. | |
| 6,130,774 A | 10/2000 | Albert et al. | |
| 6,137,467 A | 10/2000 | Sheridon et al. | |
| 6,144,361 A | 11/2000 | Gordon, II et al. | |
| 6,147,791 A | 11/2000 | Sheridon | |
| 6,172,798 B1 | 1/2001 | Albert et al. | |
| 6,177,921 B1 | 1/2001 | Comiskey et al. | |
| 6,184,856 B1 | 2/2001 | Gordon, II et al. | |
| 6,187,523 B1 | 2/2001 | Aylward et al. | |
| 6,225,971 B1 | 5/2001 | Gordon, II et al. | |
| 6,232,950 B1 | 5/2001 | Albert et al. | |
| 6,241,921 B1 | 6/2001 | Jacobson et al. | |
| 6,249,271 B1 | 6/2001 | Albert et al. | |
| 6,252,564 B1 | 6/2001 | Albert et al. | |
| 6,262,706 B1 | 7/2001 | Albert et al. | |
| 6,262,833 B1 | 7/2001 | Loxley et al. | |
| 6,271,823 B1 | 8/2001 | Gordon, II et al. | |
| 6,300,932 B1 | 10/2001 | Albert | |
| 6,301,038 B1 | 10/2001 | Fitzmaurice et al. | |
| 6,312,304 B1 | 11/2001 | Duthaler et al. | |
| 6,312,971 B1 | 11/2001 | Amundson et al. | |
| 6,323,989 B1 | 11/2001 | Jacobson et al. | |
| 6,327,072 B1 | 12/2001 | Comiskey et al. | |
| 6,376,828 B1 | 4/2002 | Comiskey | |
| 6,377,387 B1 | 4/2002 | Duthaler et al. | |
| 6,392,785 B1 | 5/2002 | Albert et al. | |
| 6,392,786 B1 | 5/2002 | Albert | |
| 6,413,790 B1 | 7/2002 | Duthaler et al. | |
| 6,422,687 B1 | 7/2002 | Jacobson | |
| 6,445,374 B2 | 9/2002 | Albert et al. | |
| 6,445,489 B1 | 9/2002 | Jacobson et al. | |
| 6,459,418 B1 | 10/2002 | Comiskey et al. | |
| 6,473,072 B1 | 10/2002 | Comiskey et al. | |
| 6,480,182 B2 | 11/2002 | Turner et al. | |
| 6,498,114 B1 | 12/2002 | Amundson et al. | |
| 6,504,524 B1 | 1/2003 | Gates et al. | |
| 6,506,438 B2 | 1/2003 | Duthaler et al. | |
| 6,512,354 B2 | 1/2003 | Jacobson et al. | |
| 6,515,649 B1 | 2/2003 | Albert et al. | |
| 6,518,949 B2 | 2/2003 | Drzaic | |
| 6,521,489 B2 | 2/2003 | Duthaler et al. | |
| 6,531,997 B1 | 3/2003 | Gates et al. | |
| 6,535,197 B1 | 3/2003 | Comiskey et al. | |
| 6,538,801 B2 | 3/2003 | Jacobson et al. | |
| 6,545,291 B1 | 4/2003 | Amundson et al. | |
| 6,580,545 B2 | 6/2003 | Morrison et al. | |
| 6,639,578 B1 | 10/2003 | Comiskey et al. | |
| 6,652,075 B2 | 11/2003 | Jacobson | |
| 6,657,772 B2 | 12/2003 | Loxley | |
| 6,664,944 B1 | 12/2003 | Albert et al. | |
| D485,294 S | 1/2004 | Albert | |
| 6,672,921 B1 | 1/2004 | Liang et al. | |
| 6,680,725 B1 | 1/2004 | Jacobson | |
| 6,683,333 B2 | 1/2004 | Kazlas et al. | |
| 6,693,620 B1 | 2/2004 | Herb et al. | |
| 6,704,133 B2 | 3/2004 | Gates et al. | |
| 6,710,540 B1 | 3/2004 | Albert et al. | |
| 6,721,083 B2 | 4/2004 | Jacobson et al. | |
| 6,724,519 B1 | 4/2004 | Comiskey et al. | |
| 6,727,881 B1 | 4/2004 | Albert et al. | |
| 6,738,050 B2 | 5/2004 | Comiskey et al. | |
| 6,750,473 B2 | 6/2004 | Amundson et al. | |
| 6,753,999 B2 | 6/2004 | Zehner et al. | |
| 6,788,449 B2 | 9/2004 | Liang et al. | |
| 6,816,147 B2 | 11/2004 | Albert | |
| 6,819,471 B2 | 11/2004 | Amundson et al. | |
| 6,822,782 B2 | 11/2004 | Honeyman et al. | |
| 6,825,068 B2 | 11/2004 | Denis et al. | |
| 6,825,829 B1 | 11/2004 | Albert et al. | |
| 6,825,970 B2 | 11/2004 | Goenaga et al. | |
| 6,831,769 B2 | 12/2004 | Holman et al. | |
| 6,839,158 B2 | 1/2005 | Albert et al. | |
| 6,842,167 B2 | 1/2005 | Albert et al. | |
| 6,842,279 B2 | 1/2005 | Amundson | |
| 6,842,657 B1 | 1/2005 | Drzaic et al. | |
| 6,864,875 B2 | 3/2005 | Drzaic et al. | |
| 6,865,010 B2 | 3/2005 | Duthaler et al. | |
| 6,866,760 B2 | 3/2005 | Paolini Jr. et al. | |
| 6,870,657 B1 | 3/2005 | Fitzmaurice et al. | |
| 6,870,661 B2 | 3/2005 | Pullen et al. | |
| 6,900,851 B2 | 5/2005 | Morrison et al. | |
| 6,922,276 B2 | 7/2005 | Zhang et al. | |
| 6,950,220 B2 | 9/2005 | Abramson et al. | |
| 6,958,848 B2 | 10/2005 | Cao et al. | |
| 6,967,640 B2 | 11/2005 | Albert et al. | |
| 6,980,196 B1 | 12/2005 | Turner et al. | |
| 6,982,178 B2 | 1/2006 | LeCain et al. | |
| 6,987,603 B2 | 1/2006 | Paolini, Jr. et al. | |
| 6,995,550 B2 | 2/2006 | Jacobson et al. | |
| 7,002,728 B2 | 2/2006 | Pullen et al. | |
| 7,012,600 B2 | 3/2006 | Zehner et al. | |
| 7,012,735 B2 | 3/2006 | Honeyman et al. | |
| 7,023,420 B2 | 4/2006 | Comiskey et al. | |
| 7,030,412 B1 | 4/2006 | Drzaic et al. | |
| 7,030,854 B2 | 4/2006 | Baucom et al. | |
| 7,034,783 B2 | 4/2006 | Gates et al. | |
| 7,038,655 B2 | 5/2006 | Herb et al. | |
| 7,061,663 B2 | 6/2006 | Cao et al. | |
| 7,071,913 B2 | 7/2006 | Albert et al. | |
| 7,075,502 B1 | 7/2006 | Drzaic et al. | |
| 7,075,703 B2 | 7/2006 | O'Neil et al. | |
| 7,079,305 B2 | 7/2006 | Paolini, Jr. et al. | |
| 7,106,296 B1 | 9/2006 | Jacobson | |
| 7,109,968 B2 | 9/2006 | Albert et al. | |
| 7,110,163 B2 | 9/2006 | Webber et al. | |
| 7,110,164 B2 | 9/2006 | Paolini, Jr. et al. | |
| 7,116,318 B2 | 10/2006 | Amundson et al. | |
| 7,116,466 B2 | 10/2006 | Whitesides et al. | |
| 7,119,759 B2 | 10/2006 | Zehner et al. | |
| 7,119,772 B2 | 10/2006 | Amundson et al. | |
| 7,148,128 B2 | 12/2006 | Jacobson | |
| 7,167,155 B1 | 1/2007 | Albert et al. | |
| 7,170,670 B2 | 1/2007 | Webber | |
| 7,173,752 B2 | 2/2007 | Doshi et al. | |
| 7,176,880 B2 | 2/2007 | Amundson et al. | |
| 7,180,649 B2 | 2/2007 | Morrison et al. | |
| 7,190,008 B2 | 3/2007 | Amundson et al. | |
| 7,193,625 B2 | 3/2007 | Danner et al. | |
| 7,202,847 B2 | 4/2007 | Gates | |
| 7,202,991 B2 | 4/2007 | Zhang et al. | |

| | | | | | |
|---|---|---|---|---|---|
| 7,206,119 B2 | 4/2007 | Honeyman et al. | 2006/0038772 A1 | 2/2006 | Amundson et al. |
| 7,223,672 B2 | 5/2007 | Kazlas et al. | 2006/0087479 A1 | 4/2006 | Sakurai et al. |
| 7,230,750 B2 | 6/2007 | Whitesides et al. | 2006/0087489 A1 | 4/2006 | Sakurai et al. |
| 7,230,751 B2 | 6/2007 | Whitesides et al. | 2006/0087718 A1 | 4/2006 | Takagi et al. |
| 7,236,290 B1 | 6/2007 | Zhang et al. | 2006/0139308 A1 | 6/2006 | Jacobson et al. |
| 7,236,291 B2 | 6/2007 | Kaga et al. | 2006/0139310 A1 | 6/2006 | Zehner et al. |
| 7,236,292 B2 | 6/2007 | LeCain et al. | 2006/0139311 A1 | 6/2006 | Zehner et al. |
| 7,242,513 B2 | 7/2007 | Albert et al. | 2006/0176267 A1 | 8/2006 | Honeyman et al. |
| 7,247,379 B2 | 7/2007 | Pullen et al. | 2006/0181504 A1 | 8/2006 | Kawai |
| 7,256,766 B2 | 8/2007 | Albert et al. | 2006/0194619 A1 | 8/2006 | Wilcox et al. |
| 7,259,744 B2 | 8/2007 | Arango et al. | 2006/0197737 A1 | 9/2006 | Baucom et al. |
| 7,280,094 B2 | 10/2007 | Albert | 2006/0197738 A1 | 9/2006 | Kawai |
| 7,304,634 B2 | 12/2007 | Albert et al. | 2006/0202949 A1 | 9/2006 | Danner et al. |
| 7,304,787 B2 | 12/2007 | Whitesides et al. | 2006/0209008 A1 | 9/2006 | Nihei et al. |
| 7,312,784 B2 | 12/2007 | Baucom et al. | 2006/0214906 A1 | 9/2006 | Kobayashi et al. |
| 7,312,794 B2 | 12/2007 | Zehner et al. | 2006/0231401 A1 | 10/2006 | Sakurai et al. |
| 7,312,916 B2 | 12/2007 | Pullen et al. | 2006/0232531 A1 | 10/2006 | Amundson et al. |
| 7,321,459 B2 | 1/2008 | Masuda et al. | 2006/0238488 A1 | 10/2006 | Nihei et al. |
| 7,327,511 B2 | 2/2008 | Whitesides et al. | 2006/0263927 A1 | 11/2006 | Sakurai et al. |
| 7,339,715 B2 | 3/2008 | Webber et al. | 2006/0279527 A1 | 12/2006 | Zehner et al. |
| 7,349,148 B2 | 3/2008 | Doshi et al. | 2006/0291034 A1 | 12/2006 | Patry et al. |
| 7,352,353 B2 | 4/2008 | Albert et al. | 2007/0013683 A1 | 1/2007 | Zhou et al. |
| 7,365,394 B2 | 4/2008 | Denis et al. | 2007/0035532 A1 | 2/2007 | Amundson et al. |
| 7,365,733 B2 | 4/2008 | Duthaler et al. | 2007/0035808 A1 | 2/2007 | Amundson et al. |
| 7,375,875 B2 | 5/2008 | Whitesides et al. | 2007/0052757 A1 | 3/2007 | Jacobson |
| 7,382,363 B2 | 6/2008 | Albert et al. | 2007/0057908 A1 | 3/2007 | Jacobson |
| 7,388,572 B2 | 6/2008 | Duthaler et al. | 2007/0069247 A1 | 3/2007 | Amundson et al. |
| 7,391,555 B2 | 6/2008 | Albert et al. | 2007/0085818 A1 | 4/2007 | Amundson et al. |
| 7,411,719 B2 | 8/2008 | Paolini, Jr. et al. | 2007/0091417 A1 | 4/2007 | Cao et al. |
| 7,411,720 B2 | 8/2008 | Honeyman et al. | 2007/0091418 A1 | 4/2007 | Danner et al. |
| 7,420,549 B2 | 9/2008 | Jacobson et al. | 2007/0097489 A1 | 5/2007 | Doshi et al. |
| 7,442,587 B2 | 10/2008 | Amundson et al. | 2007/0103427 A1 | 5/2007 | Zhou et al. |
| 7,443,571 B2 | 10/2008 | LeCain et al. | 2007/0109219 A1 | 5/2007 | Whitesides et al. |
| 7,453,445 B2 | 11/2008 | Amundson | 2007/0146310 A1 | 6/2007 | Paolini et al. |
| 7,492,339 B2 | 2/2009 | Amundson | 2007/0152956 A1 | 7/2007 | Danner et al. |
| 7,492,497 B2 | 2/2009 | Paolini, Jr. et al. | 2007/0153361 A1 | 7/2007 | Danner et al. |
| 7,513,813 B2 | 4/2009 | Paolini, Jr. et al. | 2007/0200795 A1 | 8/2007 | Whitesides et al. |
| 7,528,822 B2 | 5/2009 | Amundson et al. | 2007/0200874 A1 | 8/2007 | Amundson et al. |
| 7,532,388 B2 | 5/2009 | Whitesides et al. | 2007/0211002 A1 | 9/2007 | Zehner et al. |
| 7,535,624 B2 | 5/2009 | Amundson et al. | 2007/0211331 A1 | 9/2007 | Danner et al. |
| 7,545,358 B2 | 6/2009 | Gates et al. | 2007/0223079 A1 | 9/2007 | Honeyman et al. |
| 7,551,346 B2 | 6/2009 | Fazel et al. | 2007/0247697 A1 | 10/2007 | Sohn et al. |
| 7,554,712 B2 | 6/2009 | Patry et al. | 2007/0285385 A1 | 12/2007 | Albert et al. |
| 7,561,324 B2 | 7/2009 | Duthaler et al. | 2007/0286975 A1 | 12/2007 | Fazel et al. |
| 7,583,251 B2 | 9/2009 | Arango et al. | 2008/0013155 A1 | 1/2008 | Honeyman et al. |
| 7,583,427 B2 | 9/2009 | Danner et al. | 2008/0013156 A1 | 1/2008 | Whitesides et al. |
| 2002/0060321 A1 | 5/2002 | Kazlas et al. | 2008/0023332 A1 | 1/2008 | Webber et al. |
| 2002/0090980 A1 | 7/2002 | Wilcox et al. | 2008/0024429 A1 | 1/2008 | Zehner |
| 2003/0102858 A1 | 6/2003 | Jacobson et al. | 2008/0024482 A1 | 1/2008 | Gates et al. |
| 2003/0214697 A1 | 11/2003 | Duthaler et al. | 2008/0030832 A1 | 2/2008 | Paolini, Jr. et al. |
| 2004/0105036 A1 | 6/2004 | Danner et al. | 2008/0043318 A1 | 2/2008 | Whitesides et al. |
| 2004/0112750 A1 | 6/2004 | Jacobson et al. | 2008/0048969 A1 | 2/2008 | Whitesides et al. |
| 2004/0119681 A1 | 6/2004 | Albert et al. | 2008/0048970 A1 | 2/2008 | Drzaic et al. |
| 2004/0180476 A1 | 9/2004 | Kazlas et al. | 2008/0054879 A1 | 3/2008 | LeCain et al. |
| 2004/0190114 A1 | 9/2004 | Jacobson et al. | 2008/0057252 A1 | 3/2008 | Danner et al. |
| 2004/0263947 A1 | 12/2004 | Drzaic et al. | 2008/0074730 A1 | 3/2008 | Cao et al. |
| 2005/0001810 A1 | 1/2005 | Yakushiji et al. | 2008/0117495 A1 | 5/2008 | Arango et al. |
| 2005/0007336 A1 | 1/2005 | Albert et al. | 2008/0129667 A1 | 6/2008 | Zehner et al. |
| 2005/0012980 A1 | 1/2005 | Wilcox et al. | 2008/0130092 A1 | 6/2008 | Whitesides et al. |
| 2005/0018273 A1 | 1/2005 | Honeyman et al. | 2008/0136774 A1 | 6/2008 | Harris et al. |
| 2005/0062714 A1 | 3/2005 | Zehner et al. | 2008/0137176 A1 | 6/2008 | Isobe et al. |
| 2005/0122284 A1 | 6/2005 | Gates et al. | 2008/0150888 A1 | 6/2008 | Albert et al. |
| 2005/0122306 A1 | 6/2005 | Wilcox et al. | 2008/0165122 A1 | 7/2008 | Duthaler et al. |
| 2005/0122563 A1 | 6/2005 | Honeyman et al. | 2008/0174853 A1 | 7/2008 | Danner et al. |
| 2005/0148088 A1 | 7/2005 | Ong | 2008/0211764 A1 | 9/2008 | Albert et al. |
| 2005/0152018 A1 | 7/2005 | Abramson et al. | 2008/0211765 A1 | 9/2008 | Comiskey et al. |
| 2005/0156340 A1 | 7/2005 | Valianatos et al. | 2008/0218839 A1 | 9/2008 | Paolini, Jr. et al. |
| 2005/0179642 A1 | 8/2005 | Wilcox et al. | 2008/0254272 A1 | 10/2008 | Danner et al. |
| 2005/0253777 A1 | 11/2005 | Zehner et al. | 2008/0264791 A1 | 10/2008 | Paolini, Jr. et al. |
| 2005/0259068 A1 | 11/2005 | Nihei et al. | 2008/0266245 A1 | 10/2008 | Wilcox et al. |
| 2005/0259312 A1 | 11/2005 | Miyazaki et al. | 2008/0266646 A1 | 10/2008 | Wilcox et al. |
| 2005/0270261 A1 | 12/2005 | Danner et al. | 2008/0273132 A1 | 11/2008 | Hsu et al. |
| 2005/0280626 A1 | 12/2005 | Amundson et al. | 2008/0291129 A1 | 11/2008 | Harris et al. |

| | | |
|---|---|---|
| 2008/0299859 A1 | 12/2008 | Paolini, Jr. et al. |
| 2008/0309350 A1 | 12/2008 | Danner et al. |
| 2008/0316582 A1 | 12/2008 | Danner et al. |
| 2009/0000729 A1 | 1/2009 | Danner et al. |
| 2009/0004442 A1 | 1/2009 | Danner |
| 2009/0009852 A1 | 1/2009 | Honeyman et al. |
| 2009/0027762 A1 | 1/2009 | Comiskey et al. |
| 2009/0029527 A1 | 1/2009 | Amundson et al. |
| 2009/0034057 A1 | 2/2009 | LeCain et al. |
| 2009/0040594 A1 | 2/2009 | Albert et al. |
| 2009/0046082 A1 | 2/2009 | Jacobson et al. |
| 2009/0109519 A1 | 4/2009 | Wu et al. |
| 2009/0109522 A1 | 4/2009 | Paolini, Jr. et al. |
| 2009/0122389 A1 | 5/2009 | Whitesides et al. |
| 2009/0168067 A1 | 7/2009 | LeCain et al. |
| 2009/0174651 A1 | 7/2009 | Jacobson et al. |
| 2009/0179923 A1 | 7/2009 | Amundson et al. |
| 2009/0195568 A1 | 8/2009 | Sjodin |

FOREIGN PATENT DOCUMENTS

| | | |
|---|---|---|
| EP | 1 145 072 B1 | 5/2003 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/079442 | 9/2004 |

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gates, H. et al., "A5 Sized Electronic Paper Display for Document Viewing", SID 05 Digest, (2005).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Jacobson, J., et al., "The last book", IBM Systems J., 36, 457 (1997).

Jo, G-R, et al., "Toner Display Based on Particle Movements", Chem. Mater, 14, 664 (2002).

Johnson, M. et al., "High Quality Images on Electronic Paper Displays", SID 05 Digest, 1666 (2005).

Kazlas, P. et al., "Card-size Active-matrix Electronic Ink Display", Eurodisplay 2002, 259 (2002).

Kazlas, P., et al., "12.1" SVGA Microencapsulated Electrophoretic Active Matrix Display for Information Applicances, SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

MATERIALS FOR USE IN ELECTROPHORETIC DISPLAYS

REFERENCE TO RELATED APPLICATIONS

This application is a continuation-in-part of application Ser. No. 10/063,236, filed Apr. 2, 2002 (Publication No. 2002/0180687, now U.S. Pat. No. 7,170,670), which claims benefit of Application Ser. No. 60/280,951, filed Apr. 2, 2001. This application is also a continuation-in-part of application Ser. No. 10/711,829, filed Oct. 7, 2004 (Publication No. 2005/0168799, now U.S. Pat. No. 7,230,750), which claims benefit of Application Ser. No. 60/481,486, filed Oct. 8, 2003; Application Ser. No. 60/481,572, filed Oct. 28, 2003; and Application Ser. No. 60/481,574, filed Oct. 29, 2003. application Ser. No. 10/711,829 is also a continuation-in-part of application Ser. No. 10/708,130, filed Feb. 9, 2004 (now U.S. Pat. No. 7,002,728), which itself is a continuation-in-part of application Ser. No. 10/063,803 filed May 15, 2002 (now U.S. Pat. No. 6,822,782), which claims benefit of Application Ser. No. 60/291,081, filed May 15, 2001. This application is also a continuation-in-part of application Ser. No. 10/905,746, filed Jan. 19, 2005 (Publication No. 2005/0156340), which claims benefit of Application Ser. No. 60/481,920, filed Jan. 20, 2004 and Application Ser. No. 60/521,010, filed Feb. 5, 2004. This application is also a continuation-in-part of application Ser. No. 10/907,140, filed Mar. 22, 2005 (Publication No. 2005/0213191, U.S. Pat. No. 7,327,511), which claims benefit of Application Ser. No. 60/555,529, filed Mar. 23, 2004 and Application Ser. No. 60/585,879, filed Jul. 7, 2004.

This application is also related to:

(a) application Ser. No. 11/161,179, filed Jul. 26, 2005 (now U.S. Pat. No. 7,116,466), which claims benefit of Application Ser. No. 60/591,416, filed Jul. 27, 2004; and (b) application Ser. No. 11/162,188, filed Aug. 31, 2005 (Publication No. 2006/0038772), which claims benefit of Application Ser. No. 60/605,761, filed Aug. 31, 2004.

The entire contents of these applications, and of all other U.S. patents and published and applications mentioned below, are herein incorporated by reference.

BACKGROUND OF INVENTION

This invention relates to materials for use in electrophoretic media and displays. More specifically, in one aspect this invention relates to an electrophoretic medium and display containing a fluid which reduces haze. In another aspect, this invention relates to an electrophoretic medium and display with improved image stability.

Electrophoretic displays have been the subject of intense research and development for a number of years. Such displays can have attributes of good brightness and contrast, wide viewing angles, state bistability, and low power consumption when compared with liquid crystal displays. The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. (In practice, some electrophoretic displays, including some of the displays of the present invention, are capable of achieving multiple gray states, and, are stable not only in their extreme black and white optical states, but also in their intermediate gray states. Although such displays should properly be described as "multi-stable" rather than "bistable", the latter term may be used herein for convenience.) The optical property which is changed by application of an electric field is typically color perceptible to the human eye, but may be another optical property, such as optical transmission, reflectance, luminescence or, in the case of displays intended for machine reading, pseudo-color in the sense of a change in reflectance of electromagnetic wavelengths outside the visible range. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,200; 6,958,848; 6,967,640; 6,982,178; 6,987,603; 6,995,550; 7,002,728; 7,012,600; 7,012,735; 7,023,430; 7,030,412; 7,030,854;

7,034,783; 7,038,655; 7,061,663; 7,071,913; 7,075,502; 7,075,703; 7,079,305; 7,106,296; 7,109,968; 7,110,163; 7,110,164; 7,116,318; 7,116,466; 7,119,759; 7,119,772; and 7,148,128; and U.S. Patent Applications Publication Nos. 2002/0060321; 2002/0090980; 2002/0180687; 2003/ 0011560; 2003/0102858; 2003/0151702; 2003/0222315; 2004/0014265; 2004/0075634; 2004/0094422; 2004/ 0105036; 2004/0112750; 2004/0119681; 2004/0136048; 2004/0155857; 2004/0180476; 2004/0190114; 2004/ 0196215; 2004/0226820; 2004/0239614; 2004/0257635; 2004/0263947; 2005/0000813; 2005/0007336; 2005/ 0012980; 2005/0017944; 2005/0018273; 2005/0024353; 2005/0062714; 2005/0067656; 2005/0078099; 2005/ 0099672; 2005/0122284; 2005/0122306; 2005/0122563; 2005/0122565; 2005/0134554; 2005/0146774; 2005/ 0151709; 2005/0152018; 2005/0152022; 2005/0156340; 2005/0168799; 2005/0179642; 2005/0190137; 2005/ 0212747; 2005/0213191; 2005/0219184; 2005/0253777; 2005/0270261; 2005/0280626; 2006/0007527; 2006/ 0024437; 2006/0038772; 2006/0139308; 2006/0139310; 2006/0139311; 2006/0176267; 2006/0181492; 2006/ 0181504; 2006/0194619; 2006/0197736; 2006/0197737; 2006/0197738; 2006/0198014; 2006/0202949; and 2006/ 0209388; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called "polymer-dispersed electrophoretic display" in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, WO 01/02899, at page 10, lines 6-19. See also copending application Ser. No. 09/683,903, filed Feb. 28, 2002 (now U.S. Pat. No. 6,866,760).

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published US Application No. 2002/0075556, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and 5,872, 552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated, electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

Although as already mentioned, electrophoretic displays exhibit bistability, this bistability is not unlimited, and images on the display slowly fade with time, so that if an image is to be maintained for extended periods, the image must be refreshed periodically (and the intervals at which such refreshing is necessary is a convenient quantitative measure of image stability). Also, in many systems which lack image stability, it is necessary to apply so-called "blanking pulses" at regular intervals; such blanking pulses involve first driving all the pixels of the display to one optical state (for example, a white state), then driving all the pixels to the opposite optical state (for example, black), and then writing the desired image. Since such refreshing and blanking of the display inherently consumes energy, and the blanking pulses are distracting for a user who is trying to concentrate on an image, it is desirable to minimize such refreshing and blanking, that is to say, to increase the bistability of the display so that the intervals between refreshing and/or blanking of the image can be increased, and the power consumption of the display thus reduced. For example, one potential application of electrophoretic displays is in personal digital assistants (PDA's) where the inherent size and weight limitations of the device, and the need for the screen to be visible under a wide variety of lighting conditions, render low power consumption and reflective mode of electrophoretic displays very attractive. It is common for the user of a PDA to keep a single image, such as a list of telephone numbers, on the screen for an extended period, and in order to keep the energy consumption of the PDA and distractions to the user to an absolute minimum, it is desirable that this be achievable without the need for any refreshing or blanking of the display during this extended period.

It has been found, by one of the present inventors and his co-workers, that the main factor limiting image stability in electrophoretic displays of the types described in the aforementioned patents and applications is settling of the electrophoretic pigment particles under gravity. Since the rate of such settling is to a first approximation inversely proportional to the viscosity of the liquid phase in which the pigment particles are suspended, the stability of the image can be increased by increasing the viscosity of the liquid phase. Unfortunately, as is well known to those skilled in the technology of electrophoretic displays, the electrophoretic mobility of the pigment particles (the rate at which the particles move through the liquid phase under a given electric field) is also inversely proportional to the viscosity of the liquid phase, and thus the switching time of the display (the time required to change a given pixel of the display from one of its optical states to the other essentially the time necessary for the pigment particles to move through the thickness of the liquid medium) is directly proportional to the viscosity of the liquid medium. Accordingly, although it is well within the level of skill in the art to vary the viscosity of the liquid medium over a wide range, it has hitherto appeared that any chosen viscosity necessarily represents a compromise, in that increasing the viscosity will increase image stability at the cost of increased switching time. Furthermore, especially in the case of small displays such as PDA displays where it may be necessary to move through several "pages" or screens of information to find a desired datum, users will not tolerate switching times substantially in excess of about 1 second. (Although it is possible to counteract an increase in switching time due to increased viscosity of the suspending fluid by increasing the drive voltage applied to the display, this brings its own set of problems. Increasing the drive voltage necessarily increases the energy consumption of each driving pulse, and may increase the complexity and cost of the electronic circuitry required to control the driving pulses. Furthermore, in many battery-driven devices, it is not practicable to increase the driving voltage above certain limits.) Thus, it has hitherto appeared that the maximum image stability which can be achieved in a PDA or similar electrophoretic display is limited to a value which is substantially lower than is desirable for energy conservation purposes.

It is shown in the aforementioned copending application Ser. No. 10/063,236 that the addition of certain polymers to the suspending fluid used in electrophoretic displays provides an increase in image stability greater than can be accounted for by the increase in viscosity of the fluid caused by the addition of the polymer. Accordingly, the use of these polymers in the suspending fluid allows for substantial increases in image stability without excessive increase in the switching time of the display. More specifically, this copending application describes an electrophoretic medium comprising a plurality of particles suspended in a suspending fluid, the particles being capable of moving through the fluid upon application of an electric field to the medium, the fluid having dissolved or dispersed therein a polymer having a number average molecular weight in excess of about 20,000, the polymer being essentially non-absorbing on the particles. This copending application also describes an electrophoretic medium comprising a plurality of particles suspended in a hydrocarbon suspending fluid, the particles being capable of moving through the fluid upon application of an electric field to the medium, the fluid having dissolved or dispersed therein a polyisobutylene having a viscosity average molecular weight in the range of about 400,000 to 1,200,000 g/mole, the polyisobutylene comprising from about 0.25 to about 2.5 per cent by weight of the suspending fluid. Furthermore, this copending application also describes an electrophoretic medium comprising a plurality of particles suspended in a suspending fluid, the particles being capable of moving through the fluid upon application of an electric field to the medium, the fluid having dissolved or dispersed therein a polymer having an intrinsic viscosity of [η] in the suspending fluid and being substantially free from ionic or ionizable groups in the suspending fluid, the polymer being present in the suspending fluid in a concentration of from about 0.5 $[\eta]^{-1}$ to about 2.0 $[\eta]^{-1}$.

The polyisobutylene used in the worked Examples of the aforementioned copending application Ser. No. 10/063,236 gives good results in many electrophoretic media. However, there are certain electrophoretic media where use of polyisobutylene is not practicable. For example, polyisobutylene tends to degrade under very high shear conditions, so that if the process used to produce the electrophoretic medium requires the use of very high shear conditions, polyisobutylene may not be useful. Furthermore, as described in more detail below, there are certain fluids useful in electrophoretic media in which polyisobutylene is not sufficiently soluble to be useful in increasing image stability. Accordingly, one aspect of the present invention relates to electrophoretic media generally similar to those described in the aforementioned copending application Ser. No. 10/063,236 and having high image stability, but containing polymers other than polyisobutylene.

Another aspect of the present invention relates to reducing haze in variable transmission windows and similar light modulators. As described in the aforementioned copending application Ser. No. 10/907,140, one potentially important application of electrophoretic media is in light modulators, that is to say to variable transmission windows, mirrors and similar devices designed to modulate the amount of light or other electro-magnetic radiation passing therethrough; for convenience, the term "light" will normally be used herein, but this term should be understood in a broad sense to include electro-magnetic radiation at non-visible wavelengths. For example, the present invention may be applied to provide windows which can modulate infra-red radiation for controlling temperatures within buildings.

One potentially important market for electrophoretic media is windows with variable light transmission. As the energy performance of buildings and vehicles becomes increasingly important, electrophoretic media could be used as coatings on windows to enable the proportion of incident radiation transmitted through the windows to be electronically controlled by varying the optical state of the electrophoretic media. Effective implementation of such "variable-transmissivity" ("VT") technology in buildings is expected to provide (1) reduction of unwanted heating effects during hot weather, thus reducing the amount of energy needed for cooling, the size of air conditioning plants, and peak electricity demand; (2) increased use of natural daylight, thus reducing energy used for lighting and peak electricity demand; and (3) increased occupant comfort by increasing both thermal and visual comfort. Even greater benefits would be expected to accrue in an automobile, where the ratio of glazed surface to enclosed volume is significantly larger than in a typical building. Specifically, effective implementation of VT technology in automobiles is expected to provide not only the aforementioned benefits but also (1) increased motoring safety, (2) reduced glare, (3) enhanced mirror performance (by using an electro-optic coating on the mirror), and (4) increased ability to use heads-up displays. Other potential applications include of VT technology include privacy glass and glare-guards in electronic devices.

The aforementioned copending application Ser. No. 10/907,140 describes various factors which are important in adapting electrophoretic media for optimum performance in light modulators. One important factor is minimization of haze. In this application, "haze" refers to the percentage of diffuse transmitted light (light that is scattered as it is transmitted), compared to total transmitted light. In order to create a variable transmission film (VTF) with reduced haze it is important to match the refractive index of all components present at non-planar interfaces. In capsule-based electrophoretic media such non-planar interfaces exist at the boundaries between the internal phase (the electrophoretic particles and the surrounding fluid) and the capsule walls, and at the boundaries between the capsules walls and the binder which, as described in the aforementioned E Ink and MIT patents and applications, normally surrounds the capsules and forms them into a coherent layer. In polymer-dispersed and some microcell electrophoretic media, such curved surfaces exist at the boundaries between the internal phase and the surrounding continuous phase or binder.

It has been found empirically that even small differences in refractive index at the relevant boundaries can produce major increases in haze; in practice, as shown in the Examples below, for every 0.001 difference in refractive index between an internal phase (the "refractive index of the internal phase" is of course in practice the refractive index of the fluid therein) and a surrounding capsule wall, haze increases by about 1 per cent, and approximately the same relationship holds for index mismatches between an internal phase and a binder with which it is contact. Hence, for most commercial applications, index matching to better than 0.010 in refractive index is needed. Achieving such tight refractive index matching poses considerable difficulties, because the materials normally used to form capsules walls or binders have considerably higher refractive indices than the fluids normally used in internal phases. For example, many of the aforementioned E Ink and MIT patents and applications describe encapsulated electrophoretic media having capsule walls formed from a coacervate of gelatin and acacia; this coacervate has a refractive index of about 1.540. The binders conventionally used in the polymer-dispersed electrophoretic media described in the aforementioned U.S. Pat. No. 6,866,760 have a refractive index of about 1.5220. In contrast, most of the aforementioned E Ink and MIT patents and applications describe electrophoretic media using hydrocarbon solvents having refractive indices of about 1.416, or mixtures of such hydrocarbon solvents with Halocarbon 0.8 oil, a low molecular weight polymer of chlorotrifluoroethylene, and such mixtures will have similar refractive indices to the hydrocarbon solvents themselves. The resultant refractive index mis-match of about 0.1 between the internal phase and the surrounding material is far too great to be tolerated in a light modulator.

The present invention provides electrophoretic media which have a low refractive index difference between the internal phase and the surrounding material and which are hence very suitable for use in light modulators.

SUMMARY OF THE INVENTION

In one aspect, the present invention provides an electrophoretic medium comprising a plurality of particles disposed in a fluid, the particles being capable of moving through the fluid upon application of an electric field to the medium, the fluid having dissolved or dispersed therein an aggregating polymer which forms micelle-like structures in the fluid, the aggregating polymer being essentially non-absorbing on the particles, the aggregating polymer comprising a diblock copolymer having a first block soluble in the fluid and a second block not swellable by the fluid.

This aspect of the invention may hereinafter be referred to as the "diblock copolymer" medium of the invention. The diblock copolymer may comprise a first polystyrene block and a second block of a polyalkene. The preferred type of block copolymer comprises repeating units derived from styrene and isoprene. The copolymer will typically comprise from about 20 to about 40 weight per cent styrene. The block copolymer may be present in an amount of from about 0.25 to about 2.5 per cent by weight of the suspending fluid. The electrophoretic medium may be encapsulated, with the fluid and particles being retained within a plurality of capsules or microcells. Alternatively, the electrophoretic medium may be of the polymer-dispersed or two-phase type, with the fluid and particles forming a discontinuous phase comprising a plurality of droplets, the droplets being surrounded by a continuous phase.

Another form of the diblock copolymer medium of the present invention is an electrophoretic medium comprising a plurality of particles suspended in a fluid, the particles being capable of moving through the fluid upon application of an electric field to the medium, the fluid having dissolved or dispersed therein a polymer having an intrinsic viscosity of [η] in the fluid and being substantially free from ionic or ionizable groups in the fluid, the polymer being present in the suspending fluid in a concentration of from about 0.5 $[\eta]^{-1}$ to about 2.0 $[\eta]^{-1}$, the polymer comprising an aggregating polymer which forms micelle-like structures in the fluid, the aggregating polymer being essentially non-absorbing on the particles, the aggregating polymer comprising a diblock copolymer having a first block soluble in the fluid and a second block not swellable by the fluid.

In another aspect, this invention provides an electrophoretic medium comprising a plurality of particles disposed in a fluid, the particles being capable of moving through the fluid upon application of an electric field to the medium, the fluid comprising a partially hydrogenated aromatic hydrocarbon and a terpene.

This aspect of the invention may hereinafter be referred to as the "mixed fluid" medium of the invention. In such a mixed fluid medium, the partially hydrogenated aromatic hydrocarbon may comprise a partially hydrogenated terphenyl, while the terpene may comprise d-limonene. As in the block copolymer medium, the mixed fluid medium may be encapsulated, with the fluid and particles being retained within a plurality of capsules. In such an encapsulated medium, the capsule walls may be formed from a coacervate of gelatin and acacia, and the difference in refractive index between the capsule walls and the fluid may be not greater than about 0.005. Alternatively, the medium may be of the polymer-dispersed type, with the fluid and the particles present as a plurality of discrete droplets in a continuous phase. The continuous phase may comprise gelatin or a mixture of poly (vinyl alcohol) and poly(vinylpyrrolidone) and the difference in refractive index between the capsule walls and the fluid may be not greater than about 0.005. The fluid may have dispersed therein a polystyrene having a weight average molecular weight in the range of about 10 kD to about 500 kD, preferably about 12 kD to about 100 kD.

This invention extends to an electrophoretic display comprising a mixed fluid electrophoretic medium of the present invention and at least one electrode arranged to apply an electric field to the electrophoretic medium. Such an electrophoretic display may further comprise voltage supply means arranged to supply voltages to the at least one electrode, the voltage supply means being arranged to drive the electrophoretic medium to a first optical state in which the medium is light transmissive and to a second optical state in which the medium is light absorbing. Such an electrophoretic display may further comprise at least one sheet of light transmissive material disposed adjacent the electrophoretic medium, so that the electrophoretic display forms a variable transmission window.

In another aspect, this invention provides an electrophoretic medium comprising a plurality of particles disposed in a fluid, the particles being capable of moving through the fluid upon application of an electric field to the medium, the fluid having dissolved or dispersed therein a polystyrene having a weight average molecular weight in the range of about 10 kD to about 500 kD.

This aspect of the invention may hereinafter be referred to as the "polystyrene" medium of the invention. In such a polystyrene medium, the polystyrene may have a weight average molecular weight in the range of about 12 kD to about 100 kD, and preferably in the range of about 15 kD to about 25 kD. The polystyrene may be present in an amount of from about 1.0 to about 2.0 times its overlap concentration in the fluid. The electrophoretic medium may be encapsulated, with the fluid and particles being retained within a plurality of capsules or microcells. Alternatively, the electrophoretic medium may be of the polymer-dispersed type, with the fluid and the particles present as a plurality of discrete droplets in a continuous phase.

This invention extends to an electrophoretic display comprising a polystyrene electrophoretic medium of the present invention and at least one electrode arranged to apply an electric field to the electrophoretic medium. Such an electrophoretic display may further comprise voltage supply means arranged to supply voltages to the at least one electrode, the voltage supply means being arranged to drive the electrophoretic medium to a first optical state in which the medium is light transmissive and to a second optical state in which the medium is light absorbing. Such an electrophoretic display may further comprise at least one sheet of light transmissive material disposed adjacent the electrophoretic medium, so that the electrophoretic display forms a variable transmission window.

Finally, this invention provides an electrophoretic medium comprising a plurality of particles disposed in a fluid, the particles being capable of moving through the fluid upon application of an electric field to the medium, the fluid having dissolved or dispersed therein a polymer having an intrinsic viscosity of $[\eta]$ in the fluid and being substantially free from ionic or ionizable groups in the fluid, the polymer being present in the suspending fluid in a concentration of from about $0.5\ [\eta]^{-1}$ to about $2.0\ [\eta]^{-1}$, the polymer comprising a polystyrene having a weight average molecular weight in the range of about 10 kD to about 500 kD.

DETAILED DESCRIPTION

As already indicated, there are three principal aspects of the present invention, namely the diblock copolymer electrophoretic medium, the mixed fluid electrophoretic medium and the polystyrene electrophoretic medium. These three principal aspects will mainly be described separately below, but it should be appreciated that more than one aspect of the present invention may be used in a single electrophoretic medium. In particular, as discussed in detail below, a preferred variable transmission window of the present invention may use both the mixed fluid and polystyrene aspects of the present invention.

Before discussing the principal aspects of the present invention in detail, however, the following general introduction, applicable to all aspects of the invention, is offered.

As already mentioned, the present invention relates to an electrophoretic medium comprising a plurality of particles disposed in a fluid. The particles are capable of moving through the fluid upon application of an electric field to the medium. The fluid may contain a dissolved and/or dispersed polymer.

The electrophoretic medium of the present invention may be of any of the types described in the aforementioned E Ink and MIT patents and applications, and preferred embodiments of such media will now be described with reference to FIGS. 1 to 3 of the accompanying drawings.

Figure 1A:
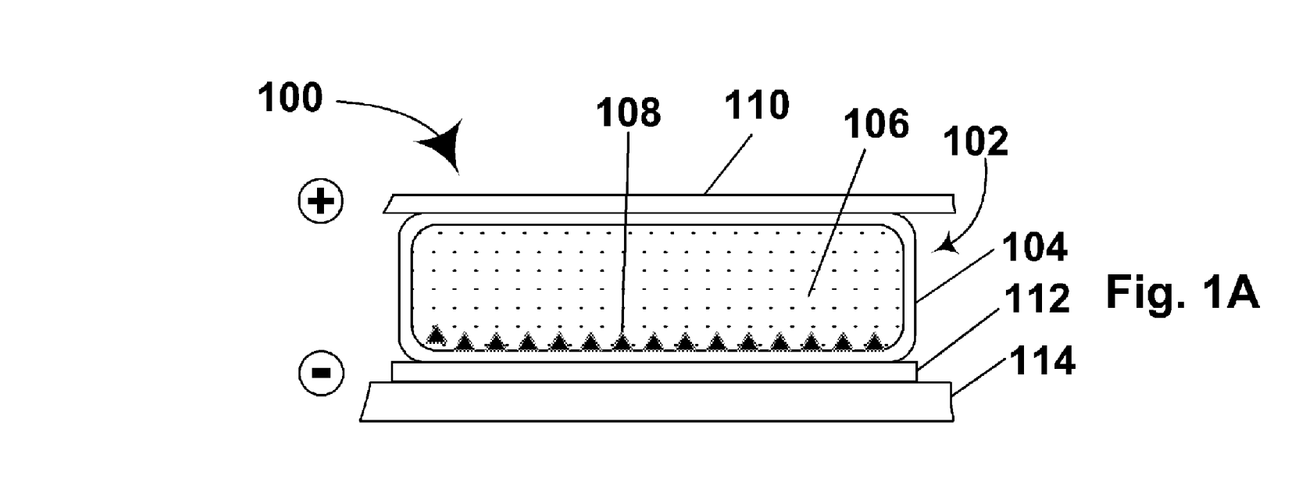
FIGS. 1A and 1B are schematic cross-sections through a first electrophoretic display of the present invention in which the electrophoretic medium comprises a single type of particle in a colored suspending fluid.
Figure 1B:
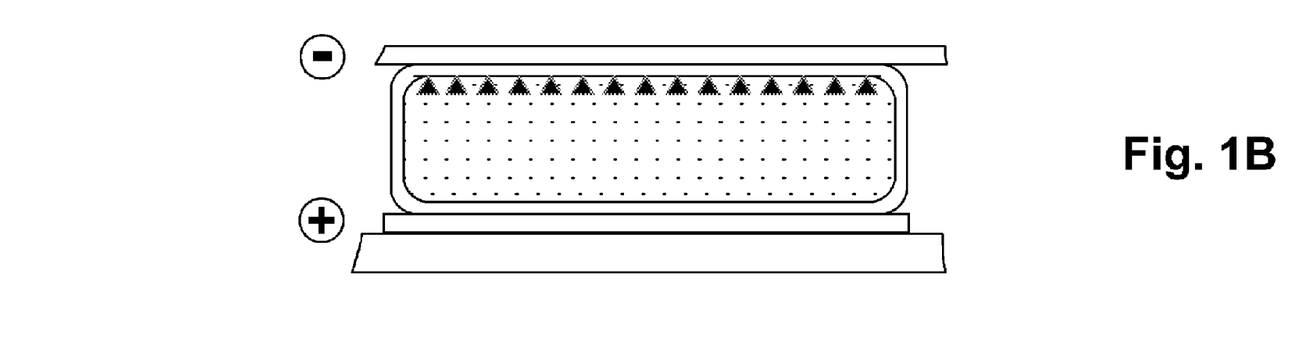

The first electrophoretic display (generally designated 100) of the invention shown in FIGS. 1A and 1B comprises an encapsulated electrophoretic medium (generally designated 102) comprising a plurality of capsules 104 (only one of which is shown in FIGS. 1A-1C), each of which contains a liquid 106 and dispersed therein a plurality of a single type of particle 108, which for purposes of illustration will be assumed to be black. The particles 108 are electrophoretically mobile and may be formed of carbon black. In the following description, it will be assumed that the particles 108 are positively charged, although of course negatively charged particles could also be used if desired. (The triangular shape of the particles 108, and the square and circular shapes of other particles discussed below, are used purely to way of illustration to enable the various types of particles to be distinguished easily in the accompanying drawings, and in no way correspond to the physical forms of the actual particles, which are typically substantially spherical. However, we do not exclude the use of non-spherical particles in the present displays.) The display 100 further comprises a common, transparent front electrode 110, which forms a viewing surface through which an observer views the display 100, and a plurality of discrete rear electrodes 112, each of which defines one pixel of the display 100 (only one rear electrode 112 is shown in FIGS. 1A and 1B). For ease of illustration and comprehension, FIGS. 1A and 1B show only a single microcapsule forming the pixel defined by rear electrode 112, although in practice a large number (20 or more) microcapsules are normally used for each pixel. The rear electrodes 112 are mounted upon a substrate 114.

The liquid 106 is colored such that the particles 108 lying in the positions shown in FIG. 1A adjacent the rear electrodes 112 are not visible to an observer viewing the display 100 via the front electrode 110. The necessary color in the liquid 106 may be provided either by dissolving a dye in the liquid. Since the colored liquid 106 and the particles 108 render the electrophoretic medium 102 opaque, the rear electrodes 112 and the substrate 114 can be transparent or opaque since they are not visible through the opaque electrophoretic medium 102.

The capsules 104 and the particles 108 can be made in a wide range of sizes. However, in general it is preferred that the thickness of the capsules, measured perpendicular to the electrodes, be in the range of about 15 to 500 μm, while the particles 108 will typically have diameters in the range of about 0.25 to about 2 μm.

FIG. 1A shows the display 100 with the rear electrode 112 negatively charged and the front electrode 110 positively charged. Under this condition, the positively-charged particles 108 are attracted to the negative rear electrode 112 and thus lie adjacent the rear electrode 112, where they are hidden from an observer viewing the display 100 through the front electrode 110 by the colored liquid 106. Accordingly, the pixel shown in FIG. 1A displays to the observer the color of the liquid 106, which for purposes of illustration will be assumed to be white. (Although the display 100 is illustrated in FIGS. 1A and 1B with the rear electrodes 112 at the bottom, in practice both the front and rear electrodes are typically disposed vertically for maximum visibility of the display 100. None of the specific embodiments of the invention described herein rely in any way upon gravity to control the movement of the particles; such movement under gravity is in practice far too slow to be useful for controlling particle movement.) FIG. 1B shows the display 100 with the front electrode 110 made negative relative to the rear electrode 112. Since the particles 108 are positively charged, they will be attracted to the negatively-charged front electrode 110, and thus the particles 108 move adjacent the front electrode 110, and the pixel displays the black color of the particles 108.

In FIGS. 1A and 1B, the capsules 104 are illustrated as being of substantially prismatic form, having a width (parallel to the planes of the electrodes) significantly greater than their height (perpendicular to these planes). This prismatic shape of the capsules 104 is deliberate. If the capsules 104 were essentially spherical, in the black state shown in FIG. 1B, the particles 108 would tend to gather in the highest part of the capsule, in a limited area centered directly above the center of the capsule. The color seen by the observer would then be essentially the average of this central black area and a white annulus surrounding this central area, where the white liquid 106 would be visible. Thus, even in this supposedly black state, the observer would see a grayish color rather than a pure black, and the contrast between the two extreme optical states of the pixel would be correspondingly limited. In contrast, with the prismatic form of microcapsule shown in FIGS. 1A and 1B, the particles 108 cover essentially the entire cross-section of the capsule so that no, or at least very little white liquid is visible, and the contrast between the extreme optical states of the capsule is enhanced. For further discussion on this point, and on the desirability of achieving close-packing of the capsules within the electrophoretic layer, the reader is referred to the aforementioned U.S. Pat. No. 6,067,185. Also, as described in the aforementioned E Ink and MIT patents and applications, to provide mechanical integrity to the electrophoretic medium, the microcapsules are normally embedded within a solid binder, but this binder is omitted from FIGS. 1 to 3 for ease of illustration.

Figure 2A:
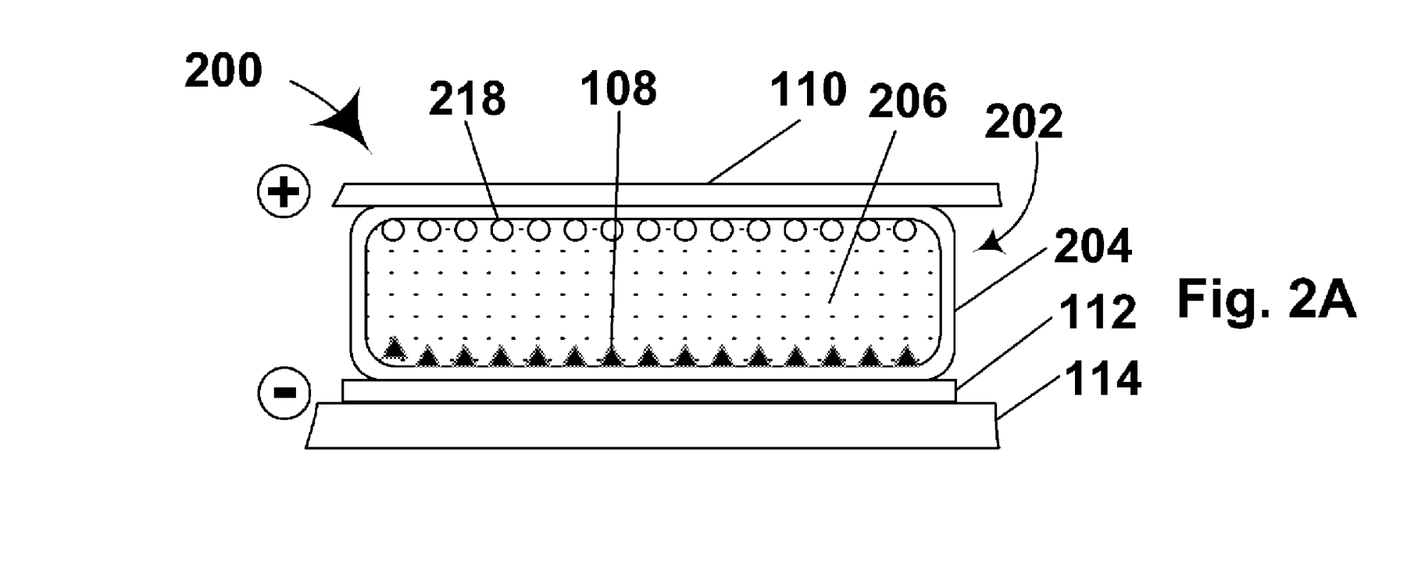
FIGS. 2A and 2B are schematic cross-sections, generally similar to those of FIGS. 1A and 1B respectively through a second electrophoretic display of the present invention in which the electrophoretic medium comprises two different types of particle, bearing charges of opposite polarity, in an uncolored suspending fluid.
Figure 2B:
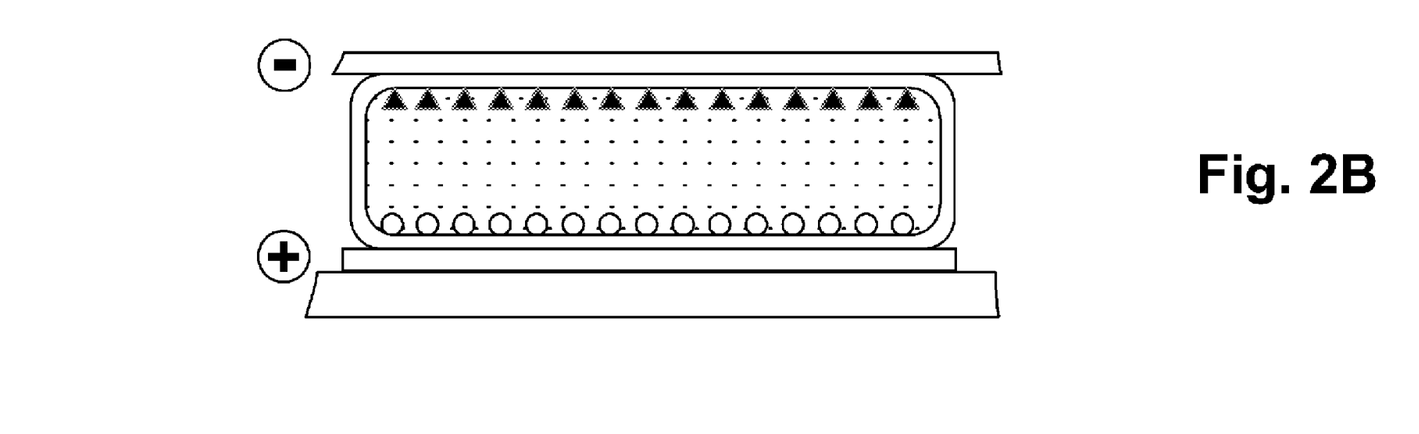

The second electrophoretic display (generally designed 200) of the invention shown in FIGS. 2A and 2B comprises an encapsulated electrophoretic medium (generally designated 202) comprising a plurality of capsules 204, each of which contains a liquid 206 and dispersed therein a plurality of positively charged black particles 108 identical discussed to those in the first display 100 discussed above. The display 200 further comprises a front electrode 110, rear electrodes 112, and a substrate 114, all of which are identical to the corresponding integers in the first display 100. However, in addition to the black particles 108, there are suspended in the liquid 206 a plurality of negatively charged, particles 218, which for present purposes will be assumed to be white.

Typically the liquid 206 is uncolored (i.e., essentially transparent), although some color may be present therein to adjust the optical properties of the various states of the display. FIG. 2A shows the display 200 with the front electrode 110 positively charged relative to the rear electrode 112 of the illustrated pixel. The positively charged particles 108 are held electrostatically adjacent the rear electrode 112, while the negatively charged particles 218 are held electrostatically against the front electrode 110. Accordingly, an observer viewing the display 200 through the front electrode 110 sees a white pixel, since the white particles 218 are visible and hide the black particles 108.

FIG. 2B shows the display 200 with the front electrode 110 negatively charged relative to the rear electrode 112 of the illustrated pixel. As in the corresponding optical state shown in FIG. 1B, the positively charged particles 108 are now electrostatically attracted to the negative front electrode 110, while the negatively charged particles 218 are electrostatically attracted to the positive rear electrode 112. Accordingly, the particles 108 move adjacent the front electrode 110, and the pixel displays the black color of the particles 108, which hide the white particles 218.

Figure 3A:
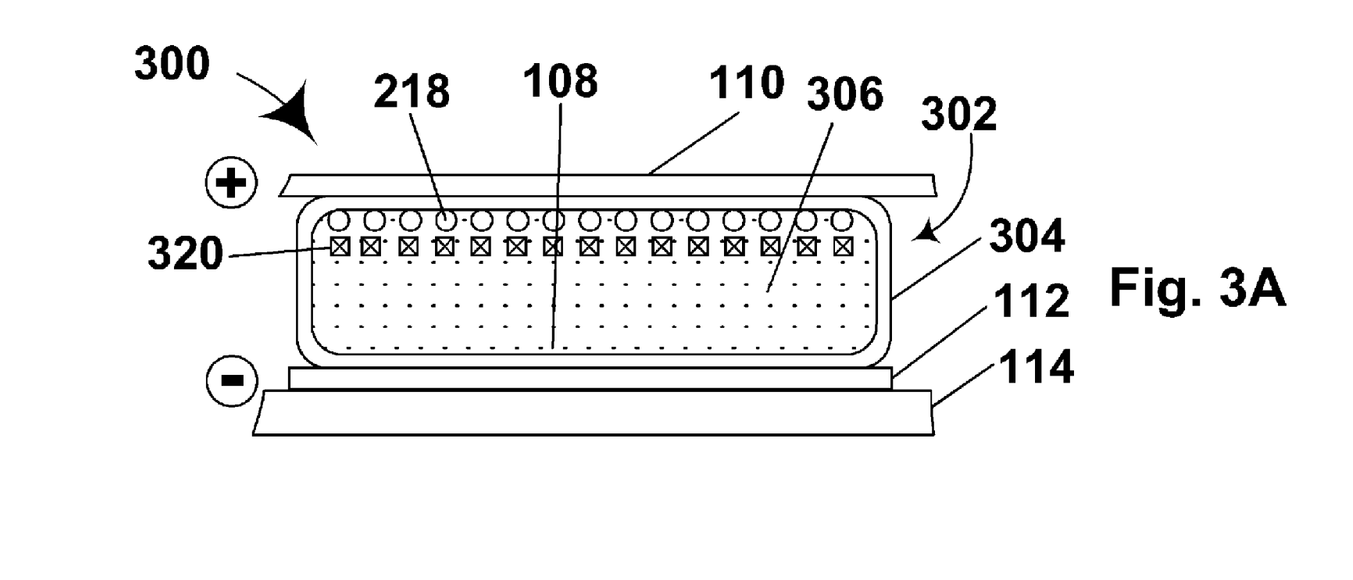
FIGS. 3A and 3B are schematic cross-sections, generally similar to those of FIGS. 2A and 2B respectively through a third electrophoretic display of the present invention in which the electrophoretic medium comprises two different types of particle, bearing charges of the same polarity but differing in electrophoretic mobility, in an uncolored suspending fluid.
Figure 3B:
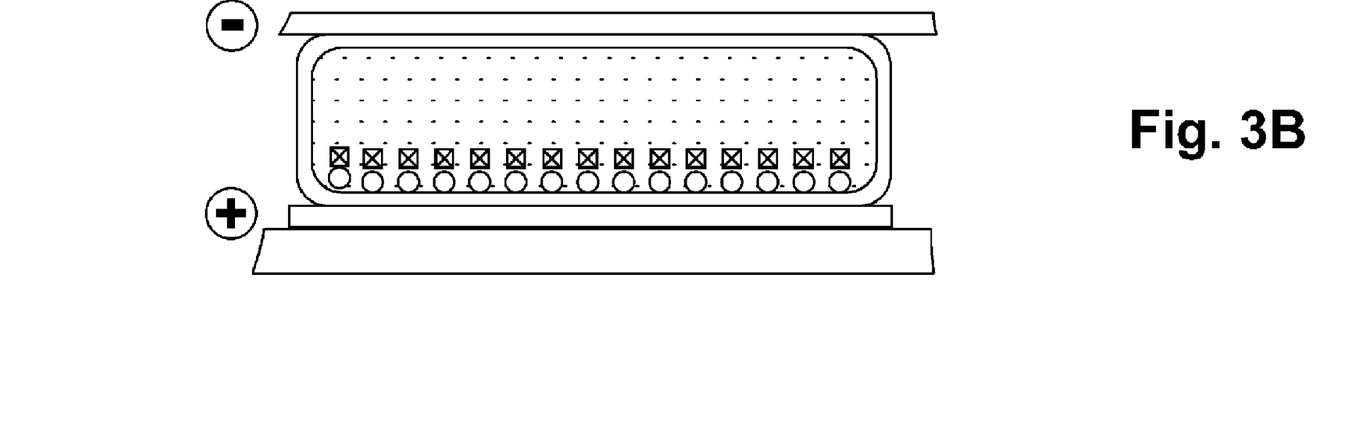

The third electrophoretic display (generally designated 300) of the invention shown in FIGS. 3A and 3B comprises an encapsulated electrophoretic medium (generally designated 302) comprising a plurality of capsules 304. The display 300 further comprises a front electrode 110, rear electrodes 112, and a substrate 114, all of which are identical to the corresponding integers in the displays 100 and 200 previously described. The display 300 resembles the display 200 described above in that the liquid 306 is uncolored and that white negatively charged particles 218 are suspended therein. However, that the display 300 differs from the display 200 by the presence of red negatively charged particles 320, which have a substantially lower electrophoretic mobility than the white particles 218.

FIG. 3A shows the display 300 with the front electrode 110 positively charged relative to the rear electrode 112 of the illustrated pixel. Both the negatively charged white particles 218 and the negatively charged red particles 320 are attracted to the front electrode 110, but since the white particles 218 have substantially higher electrophoretic mobility, that they reach the front electrode 110 first (note that the optical state shown in FIG. 3A is normally generated by abruptly reversing the polarity off the electrodes in the optical state shown in FIG. 3B, thus forcing both the white particles 218 and the red particles 320 to traverse the thickness of the capsule 304, and thus allowing the greater mobility of the white particles 218 to cause them to reach their positions adjacent the front electrode 110 before the red particles 320). Thus, the white particles 218 form a continuous layer immediately adjacent the front electrode 110, thereby hide being the red particles 320. Accordingly, an observer viewing the display 300 through the front electrode 110 sees a white pixel, since the white particles 218 are visible and hide the red particles 320.

FIG. 3B shows the display 300 with the front electrode 110 negatively charged relative to the rear electrode 112 of the illustrated pixel. Both the negatively charged white particles 218 and the negatively charged red particles 320 are attracted to the rear electrode 112, but since the white particles have higher electrophoretic mobility, when the optical state shown in FIG. 3B is produced by reversing the polarity on the electrodes in the optical state shown in FIG. 3A, the white particles 218 reach the rear electrode 112 more quickly than do the red particles 320, so that the white particles 218 form a continuous layer adjacent the electrode 112, leaving a continuous layer of the red particles 320 facing the front electrode 110. Accordingly, an observer viewing the display 300 through the front electrode 110 sees a red pixel, since the red particles 320 are visible and hide the white particles 218.

The present invention may be applied to any of the forms of encapsulated electrophoretic media shown in FIGS. 1 to 3, and to similar microcell media. However, the present invention is not restricted to encapsulated electrophoretic media, and may also be applied to unencapsulated media and to polymer-dispersed electrophoretic media which, as previously described, are of a two-phase type, with the fluid and particles forming a discontinuous phase comprising a plurality of droplets, the droplets being surrounded by a continuous phase. In such a polymer-dispersed electrophoretic medium, the droplets desirably comprise at least about 40 percent by volume all of the electrophoretic medium; see the aforementioned U.S. Pat. Nos. 6,866,760 and 7,079,305, and Patent Publication No. 2006/0007527.

Diblock Copolymer Electrophoretic Medium

As already indicated, one principal aspect of the present invention relates to electrophoretic media which are generally similar to the media described in the aforementioned copending application Ser. No. 10/063,236, but in which a diblock copolymer is used in the fluid.

As already discussed, the aforementioned copending application Ser. No. 10/063,236 describes electrophoretic media which achieve good image stability by incorporation of a high molecular weight polymer, for example polyisobutylene (PIB), that has good solubility in the suspending medium (typically an aliphatic hydrocarbon such as Isopar G) but which is not absorbed on the electrophoretic particles. The presence of this polymer in solution is believed (although the present invention is in no way limited by this belief) to induce a weak flocculation of the pigments by a mechanism known in the colloid science art as "depletion flocculation". See, for example, Tuinier, R., et al., "Depletion-induced phase separation in colloid-polymer mixtures", Advances in Colloid and Interface Science, 103 (2003), 1-31. Polymers other than PIB should be useful for the same purpose.

One problem with PIB is that is susceptible to degradation under high shear conditions. For example, the aforementioned copending application Ser. No. 10/905,746 describes a so-called "limited coalescence" process for producing capsules of a water-immiscible phase in a protein coacervate. In this process, an aqueous phase is formed comprising a colloidal alumina suspension and a promoter. The water-immiscible phase is emulsified in the aqueous phase under conditions effective to cause the formation of an unstable emulsion comprising small droplets of the water-immiscible phase in the aqueous phase. The resultant emulsion is admixed with a protein and a coacervating agent under conditions permitting coalescence of the emulsion and the formation of capsules of the aqueous phase surrounded by capsule walls of the coacervate. In some processes of this type, the vigorous homogenization conditions required to form the initial small particle oil-in-water emulsion are sufficient to degrade polyisobutylene and other high molecular weight polymers in the internal phase to such an extent that the polymer is no longer effective at providing bistability in the resultant electrophoretic medium.

If high bistability is necessary in the resultant electrophoretic medium, such bistability may be achieved using an image stabilizing polymer that is not degraded under high shear conditions. It has now been found that such non-shear-degraded polymers include aggregating polymers which form micelle-like structures in the fluid. Although the micelle-like structures may be disrupted under high shear conditions, they will spontaneously re-form after the high shear conditions terminate, and thus before the electrophoretic medium is in use in a display. The aggregating polymer should be essentially non-absorbing on the electrophoretic particles and comprise a diblock copolymer having a first block soluble in the fluid and a second block not swellable by the fluid.

When, as is typically the case, the fluid used in the electrophoretic medium is a hydrocarbon (alone or in admixture with minor proportions of other materials, for example halogenated hydrocarbons), the diblock copolymer may comprise a first polystyrene block and a second block of a polyalkene, for example polyisoprene. Such block copolymers are commercially available and include, for example aggregating diblock copolymers made from styrene and poly(ethylene-propylene), such as Kraton (Registered Trade Mark) G1701, G1702 or G1730, all available from Kraton Polymers, Inc, Belpre, Ohio). These polymers contain from about 20 to about 40 per cent styrene by weight. The diblock copolymer may include a minor proportion of a triblock copolymer, although the proportion of triblock copolymer should be controlled so as to avoid formation of a gel, or excess increase in viscosity, in the fluid.

It should be noted the molecular weight of the diblock copolymer used in the present invention is not critical since the agent which effects depletion flocculation is not the individual copolymer molecules, but rather the micelle-like structures formed by the aggregating diblock copolymer. The size of these micelle-like structures can be estimated by light scattering techniques well known to those skilled in polymer science; the structures typically correspond to molecular weights in excess of 100,000.

No matter what polymer is used to induce depletion, the incorporation of soluble, materials into the fluid of the internal phase will increase the viscosity of that fluid. Since the response time of the medium (the time needed at a given operating voltage to change the display, or any given pixel thereof, between its two extreme optical states) is proportional to the viscosity of the fluid, the switching speed of the medium will be reduced by this approach to image stability. Furthermore, since the depletion flocculation mechanism is only active at concentrations of polymer around or above the overlap concentration (which can be operationally defined as the concentration of polymer that causes the viscosity of the medium to increase by a factor of two), all polymers that act by this mechanism can be expected to produce a similar diminution of the switching speed. In practice, the switching speed is typically reduced by approximately a factor of two to three when enough polymer is used to give high image stability.

Mixed Fluid Electrophoretic Medium

As already mentioned, haze in a variable transmission electrophoretic medium is very strongly dependent upon differences in refractive index between the fluid of the internal phase and the capsule wall. To investigate just how strong this correlation is, encapsulated electrophoretic media were prepared substantially as described in the aforementioned application Ser. No. 10/063,236 with gelatin/acacia capsule walls and with internal phases having varying refractive indices, and the media were then tested for haze. The results are shown in FIG. 4.

Figure 4:
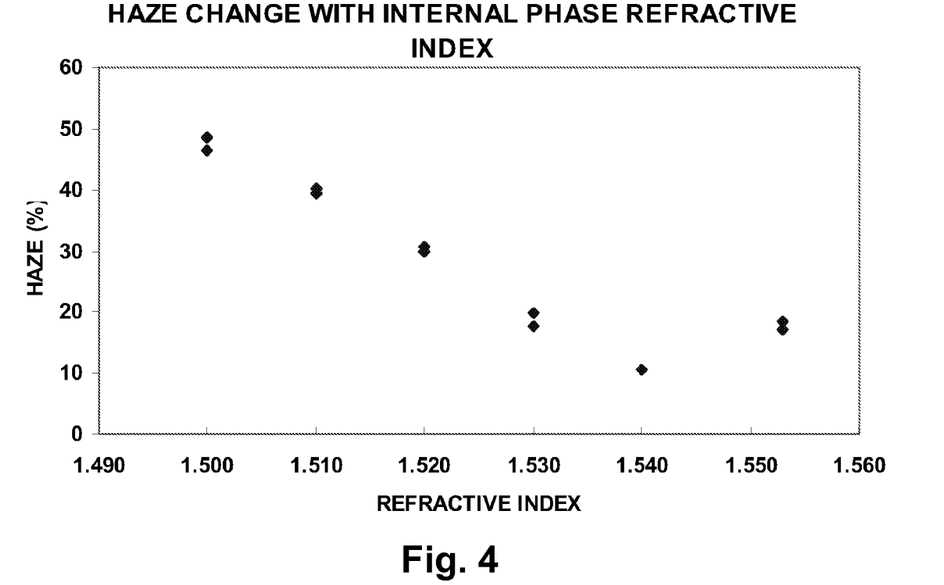
FIG. 4 is a graph illustrating the change in the haze in a light modulator with changes in the refractive index of the liquid used in the internal phase.

From FIG. 4, it will be seen that (as expected) the haze reaches a minimum when the internal phase fluid has a refractive index of 1.540, equal to the refractive index of the capsule walls. FIG. 4 also shows how sensitive the system is to even small refractive index differences between the internal phase fluid and the capsule walls; for every difference of 0.001 in refractive index between the internal phase fluid and the capsule wall, the haze increases by about 1 per cent. Thus, to provide a variable transmission electrophoretic medium with haze values acceptable for use in a commercial variable transmission window, the refractive indices of the internal phase fluid and the capsule wall must differ by not more than about 0.010, and preferably by not more than about 0.005.

It is not easy to find a single liquid meeting these very tight refractive index constraints and possessing all the other properties required for use in an electrophoretic medium internal phase, such properties including viscosity, long term stability, and ability to maintain stable charges on the electrophoretic particles. Furthermore, there is an additional complication in that differing types of electrophoretic media have materials of different refractive indices in contact with the internal phase. As already mentioned, the gelatin/acacia coacervate commonly used to form capsule walls in electrophoretic media has a refractive index of about 1.540. In contrast, the preferred continuous phase for polymer-dispersed electrophoretic media is a mixture of poly(vinyl alcohol) and poly(vinylpyrrolidone), typically with a minor proportion (about 5 to 10 per cent by weight) of gelatin; this continuous phase has a refractive index of about 1.522. Given the difficulty of finding a refractive index matching liquid for use in electrophoretic media which meets all the other properties required, and the amount of work necessary to check that any proposed liquid does not adversely affect the properties of an electrophoretic medium, it is highly undesirable to have to use two different types of internal phase fluid for capsule-containing and polymer-dispersed media, or to have to find a new fluid every time the refractive index of the capsule wall or continuous phase is changed.

It has now been found that mixtures of partially hydrogenated aromatic hydrocarbons and terpenes are very suitable for use as refractive index matching fluids for use in electrophoretic media. The preferred partially hydrogenated aromatic hydrocarbon for this purpose is partially hydrogenated terphenyl, available commercially as Cargille 5040 from Cargille Laboratories, 55 Commerce Rd, Cedar Grove N.J. 07009. The preferred terpene is d-limonene, a product derived from citrus fruit, used as a cleaning agent, and available commercially from a variety of suppliers. Cargille 5040 has a refractive index of 1.577, which is higher than any refractive index which is normally required to be matched, while d-limonene has a refractive index of 1.471, lower than any refractive index which is normally required to be matched. The two materials are miscible in all proportions to allow the formation of mixtures which can accurately index match most capsule and continuous phase materials likely to be used in electrophoretic media. Such mixtures have been found to have good properties for use in electrophoretic internal phases; for example, they do not interfere with proper electrical charging of the electrophoretic particles. Furthermore, such mixtures are free from the toxicity, smell and long term health issues to which possible alternative high refractive index liquids (for example halogenated aromatic solvents) are subject.

Polystyrene Electrophoretic Medium

Electrophoretic media using a mixture of a partially hydrogenated aromatic hydrocarbon and a terpene as the internal phase fluid typically require the addition of a polymer to the fluid to improve the optical state stability of the medium to a level acceptable for use in commercial variable transmission windows and similar light modulators. Although power consumption may be a less important consideration with variable transmission windows than with some other applications of electrophoretic media, since such windows can normally be powered from electric mains, it is still undesirable to have to "rewrite" such windows at frequent intervals since even slight changes in the optical transmission through such windows are likely to be noticeable and irritating to users. However, the polyisobutylene used in the aforementioned copending application Ser. No. 10/063,236 to increase image stability cannot be used with media using a mixture of a partially hydrogenated aromatic hydrocarbon and a terpene as the internal phase fluid since the polyisobutylene is not sufficiently soluble in the fluid.

As already noted, the polyisobutylene used in the worked Examples of the aforementioned copending application Ser. No. 10/063,236 is believed to exert its image stabilizing effect via a depletion flocculation mechanism. Accordingly, to achieve the same image stabilizing effect in an electrophoretic medium using a mixture of a partially hydrogenated aromatic hydrocarbon and a terpene as the internal phase fluid, it was necessary to identify a polymer not only capable of dissolving in this internal phase fluid but also capable of remaining in solution across the operational temperature range of the medium. After screening several materials, it was determined that polystyrene met these requirements. At first glance, it appears that polystyrene was an unlikely candidate since this polymer is generally known as being particularly susceptible to degradation by ultra-violet radiation. However, its has been found empirically that when a typical variable transmission window, comprising in order a glass sheet, an electrode, the polystyrene-containing internal phase, an indium-tin-oxide (ITO) electrode and a polymeric film such as poly(ethylene terephthalate) (PET), is exposed to harsh ultra-violet exposure, no significant degradation of the polystyrene is observed. Indeed, when a similar structure but without the glass sheet was exposed to the ultra-violet radiation conditions used to stress test variable transmission windows, it was found that the PET failed before the polystyrene became unacceptably degraded.

The following Examples are provided, though by way of illustration only, to show preferred types of polystyrene for use in the present invention, and the results achieved by adding polystyrene to electrophoretic medium internal phases.

EXAMPLE 1

Measurement of Overlap Concentration

It is known that the concentration of polymer needed to cause stabilization by depletion flocculation in a liquid is related to the overlap concentration of the polymer (i.e., the concentration at which the polymer chains begin to overlap one another). Accordingly, a series of experiments were conducted to determine the overlap concentration of polystyrenes of varying molecular weights in a solvent mixture which can be used as a fluid in electrophoretic media.

The overlap concentration C* is given by the Mark-Houwink equation:

$$C^* = (KM^\alpha)^{-1}$$

where K is a dimensionless constant. M is the volume average molecular weight in Daltons and α is proportional to the solubility of the polymer in the solvent. Accordingly, C* at any given temperature can be determined by plotting the specific viscosity of a polymer in a liquid against polymer concentration.

In these experiments, polystyrenes having volume average molecular weights from 382 to 983 kD were dissolved in a 1.7:1 v/v mixture of Cargille 5040 and Isopar G (a hydrocarbon solvent) at polymer concentrations well below the estimated overlap concentration to ensure a linear relationship between solution viscosity and polymer concentration, and the Mark-Houwink constants (at ambient temperature of approximately 20° C.) were determined from the slope of specific viscosity versus polymer concentration. The results are shown in FIG. 5 below.

Figure 5:
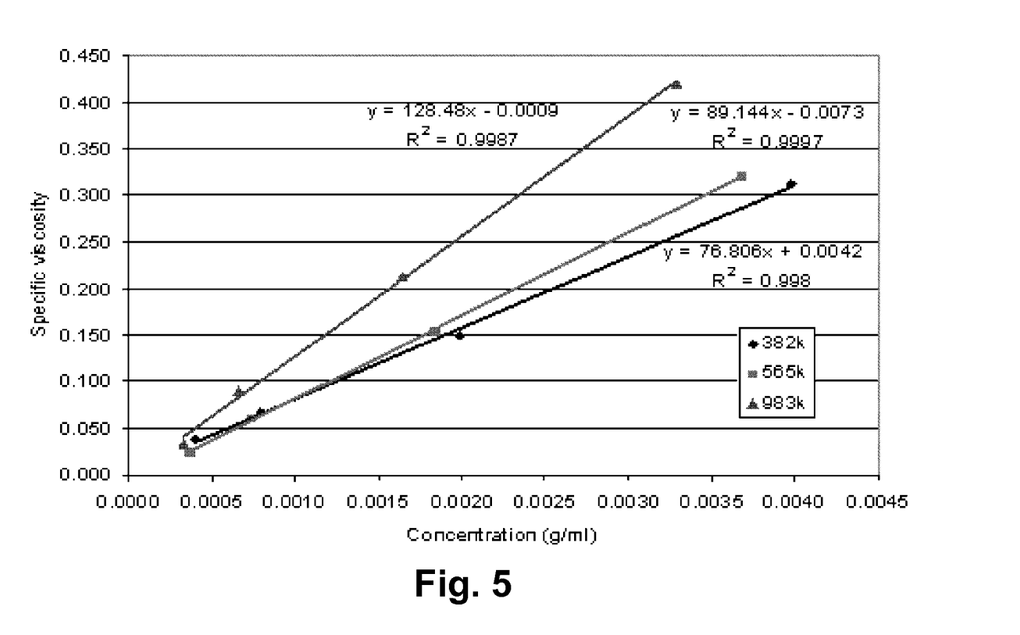
FIG. 5 is a graph showing the change in viscosity of an internal phase liquid as a function of the concentration of polystyrene therein for experiments described in Example 1 below.
Figure 6:
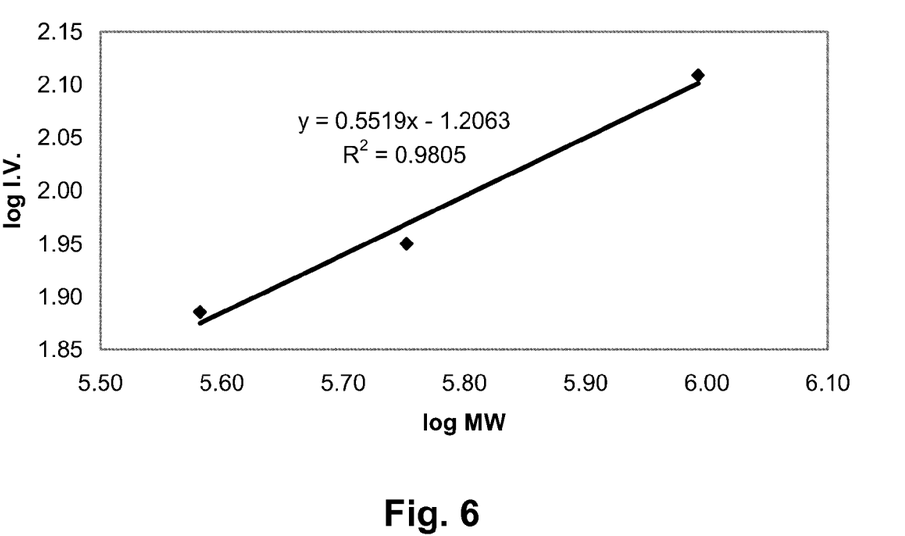
FIG. 6 is a graph showing the relationship between the intrinsic viscosity of the polystyrenes shown in FIG. 5 and their weight average molecular weights in the experiments described in Example 1 below.

In FIG. 5, the slopes of the lines represent the intrinsic viscosity of each polystyrene. FIG. 6 plots these intrinsic viscosities determined from FIG. 5 against the molecular weight of the polystyrene in a log/log plot. The slope of this line equals the Mark-Houwink solubility parameter, α, and the intercept equals $10^K$, where K is the Mark-Houwink constant, thus enabling the calculation of C* for the various polystyrene samples. The resulting value of α (about 0.55) shows that the solvent mixture used is not an ideal solvent for polystyrene but is sufficiently solvating to be effective.

EXAMPLE 2

Measurement of Optical State Stability

A series of experimental variable transmission windows were produced using polymer-dispersed polystyrene electrophoretic media of the present invention. These experimental windows used varying concentrations of five different polystyrenes with molecular weights varying from 97 to 983 kD. All the polystyrene samples had narrow polydispersisity with $M_w/M_n$ not greater than 1.3. All electrophoretic media used the same 1.7:1 v/v mixture of Cargille 5040 and Isopar G as in Example 1 above.

Figure 7:
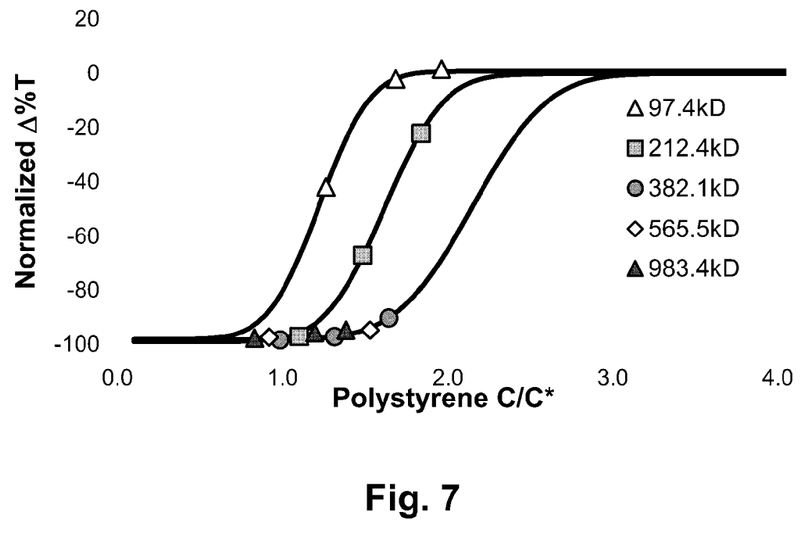
FIG. 7 is a graph showing the image stability of polystyrene electrophoretic media of the present invention as functions of the polymer concentration therein for experiments described in Example 2 below.

Each window was driven to its maximum transmission optical state, which (it was known empirically) tends to be the least stable state of such media. The optical transmission was measured immediately after the end of the drive pulse and after the medium had been thereafter allowed to stand undriven for one minute; the former transmission is denoted T and the difference between the two values ΔT. FIG. 7 plots the normalized ΔT (i.e., ΔT/T, expressed as a percentage) against polymer concentration expressed as a proportion of the overlap value. A normalized ΔT of 0 would be ideal, meaning that there was no change in transmission; 100 would indicate the display has completely reverted to its undriven state.

The results shown in FIG. 7 indicate that lower molecular weight polystyrenes are more effective for stabilizing the optical state of the medium transmission at low fractions of overlap concentration. Use of a low fraction of overlap concentration is desirable as the liquid viscosity increases more steeply with concentration for higher molecular weights, particularly after the overlap concentration has been exceeded. A higher viscosity liquid slows electrophoretic and electrophoretic motion of the electrophoretic particles, thereby requiring longer drive times and resultin greater power consumption.

In view of the results shown in FIG. 7, further experiments were conducted to determine if polystyrenes having molecular weights lower than about 97 kD (the lowest molecular weight material used in FIG. 7) are effective in increasing image stability. The following Table shows the amount of each polystyrene needed to reduce the normalized ΔT value below 2 per cent, both in terms of the volume per cent of polymer and in terms of the fraction of the overlap concentration. Results for some of the polystyrenes shown in FIG. 7 are also included in the Table

TABLE

| $M_v$, kD | C* (Vol %) | C/C* |
|---|---|---|
| 13 | 8.6 | 1.05 |
| 20 | 6.8 | 1.03 |
| 35 | 5.0 | 1.4 |
| 97 | 2.8 | 1.9 |
| 382 | 1.3 | 2.4 |
| 566 | 1.1 | >3 |
| 983 | 0.8 | >3 |

From this Table, it can be seen that polystyrenes having volume average molecular weights as low as 13 kD are effective in causing depletion flocculation and hence increasing image stability. However, from these data it appears that a volume average molecular weight of about 20 kD is optimum for this purpose.

As indicated above, the polystyrene aspect of the present invention is primarily intended for use in light modulators and other types of electrophoretic which operate in shutter mode. However, all aspects of the present invention can also be used in any of the applications in which electrophoretic displays have previously been employed. Thus, for example, the present displays may be used in electronic book readers, portable computers, tablet computers, cellular telephones, smart cards, signs, watches, shelf labels and flash drives.

Numerous changes and modifications can be made in the preferred embodiments of the present invention already described without departing from the scope of the invention. Accordingly, the foregoing description is to be construed in an illustrative and not in a limitative sense.

The invention claimed is:

1. An electrophoretic medium comprising a plurality of particles disposed in a fluid, the particles being capable of moving through the fluid upon application of an electric field to the medium, the fluid having dissolved or dispersed therein an aggregating polymer which forms micelle-like structures in the fluid, the aggregating polymer being essentially non-absorbing on the particles, the aggregating polymer comprising a diblock copolymer having a first block soluble in the fluid and a second block not swellable by the fluid.

2. An electrophoretic medium according to claim 1 wherein the diblock copolymer comprises a first polystyrene block and a second block of a polyalkene.

3. An electrophoretic medium according to claim 1 wherein the diblock copolymer comprises repeating units derived from styrene and isoprene.

4. An electrophoretic medium according to claim 1 wherein the diblock copolymer comprises from about 20 to about 40 weight per cent styrene.

5. An electrophoretic medium according to claim 1 wherein the block copolymer is present in an amount of from about 0.25 to about 2.5 per cent by weight of the fluid.

6. An electrophoretic medium according to claim 1 which is encapsulated, with the fluid and particles being retained within a plurality of capsules or microcells.

7. An electrophoretic medium according to claim 1 which is of a two-phase type, the fluid and particles forming a discontinuous phase comprising a plurality of droplets, the droplets being surrounded by a continuous phase.

8. An electrophoretic medium comprising a plurality of particles disposed in a fluid, the particles being capable of moving through the fluid upon application of an electric field to the medium, the fluid having dissolved or dispersed therein a polymer having an intrinsic viscosity of $[\eta]$ in the fluid and being substantially free from ionic or ionizable groups in the fluid, the polymer being present in the fluid in a concentration of from about 0.5 $[\eta]^{-1}$ to about 2.0 $[\eta]^{-1}$, the polymer comprising an aggregating polymer which forms micelle-like structures in the fluid, the aggregating polymer being essentially non-absorbing on the particles, the aggregating polymer comprising a diblock copolymer having a first block soluble in the fluid and a second block not swellable by the fluid.

9. An electrophoretic medium according to claim 8 wherein the diblock copolymer comprises a first polystyrene block and a second block of a polyalkene.

10. An electrophoretic medium according to claim 8 wherein the diblock copolymer comprises repeating units derived from styrene and isoprene.

11. An electrophoretic medium according to claim 8 wherein the diblock copolymer comprises from about 20 to about 40 weight per cent styrene.

12. An electrophoretic medium comprising a plurality of particles disposed in a fluid, the particles being capable of moving through the fluid upon application of an electric field to the medium, the fluid comprising a partially hydrogenated aromatic hydrocarbon and a terpene.

13. An electrophoretic medium according to claim 12 wherein the fluid comprises a partially hydrogenated terphenyl.

14. An electrophoretic medium according to claim 12 wherein the fluid comprises d-limonene.

15. An electrophoretic medium according to claim 12 which is encapsulated, with the fluid and particles being retained within a plurality of capsules.

16. An electrophoretic medium according to claim 15 wherein the capsule walls are formed from a coacervate of gelatin and acacia, and wherein the difference in refractive index between the capsule walls and the fluid is not greater than about 0.005.

17. An electrophoretic medium according to claim 12 wherein the fluid and the particles are present as a plurality of discrete droplets in a continuous phase.

18. An electrophoretic medium according to claim 17 wherein the continuous phase comprises at least one of gelatin and a mixture of poly(vinyl alcohol) and poly(vinylpyrrolidone), and wherein the difference in refractive index between the continuous phase and the fluid is not greater than about 0.005.

19. An electrophoretic medium according to claim 12 wherein the fluid has dispersed therein a polystyrene having a weight average molecular weight in the range of about 10 kD to about 500 kD.

20. An electrophoretic medium according to claim 19 wherein the polystyrene has a weight average molecular weight in the range of about 12 kD to about 100 kD.

21. An electrophoretic display comprising an electrophoretic medium according to claim 12 and at least one electrode arranged to apply an electric field to the electrophoretic medium.

22. An electrophoretic display according to claim 21 further comprising voltage supply means arranged to supply voltages to the at least one electrode, the voltage supply means being arranged to drive the electrophoretic medium to a first optical state in which the medium is light transmissive and to a second optical state in which the medium is light absorbing.

23. An electrophoretic display according to claim 22 further comprising at least one sheet of light transmissive material disposed adjacent the electrophoretic medium, whereby the electrophoretic display forms a variable transmission window.

24. An electrophoretic medium comprising a plurality of particles disposed in a fluid, the particles being capable of moving through the fluid upon application of an electric field to the medium, the fluid having dissolved or dispersed therein a polystyrene having a weight average molecular weight in the range of about 10 kD to about 500 kD.

25. An electrophoretic medium according to claim 24 wherein the polystyrene has a weight average molecular weight in the range of about 12 kD to about 100 kD.

26. An electrophoretic medium according to claim 24 wherein the polystyrene has a weight average molecular weight in the range of about 15 kD to about 25 kD.

27. An electrophoretic medium according to claim 24 wherein the polystyrene is present in an amount of from about 1.0 to about 2.0 times its overlap concentration in the fluid.

28. An electrophoretic medium according to claim 24 which is encapsulated, with the fluid and particles being retained within a plurality of capsules or microcells.

29. An electrophoretic medium according to claim 24 wherein the fluid and the particles are present as a plurality of discrete droplets in a continuous phase.

30. An electrophoretic display comprising an electrophoretic medium according to claim 24 and at least one electrode arranged to apply an electric field to the electrophoretic medium.

31. An electrophoretic display according to claim 30 further comprising voltage supply means arranged to supply voltages to the at least one electrode, the voltage supply means being arranged to drive the electrophoretic medium to a first optical state in which the medium is light transmissive and to a second optical state in which the medium is light absorbing.

32. An electrophoretic medium comprising a plurality of particles disposed in a fluid, the particles being capable of moving through the fluid upon application of an electric field to the medium, the fluid having dissolved or dispersed therein a polymer having an intrinsic viscosity of $[\eta]$ in the fluid and being substantially free from ionic or ionizable groups in the fluid, the polymer being present in the fluid in a concentration of from about 0.5 $[\eta]^{-1}$ to about 2.0 $[\eta]^{-1}$, the polymer comprising a polystyrene having a weight average molecular weight in the range of about 10 kD to about 500 kD.

* * * * *